May 14, 1929.  A. J. HARTFIELD  1,712,885
GAS BURNER
Filed Jan. 3, 1928
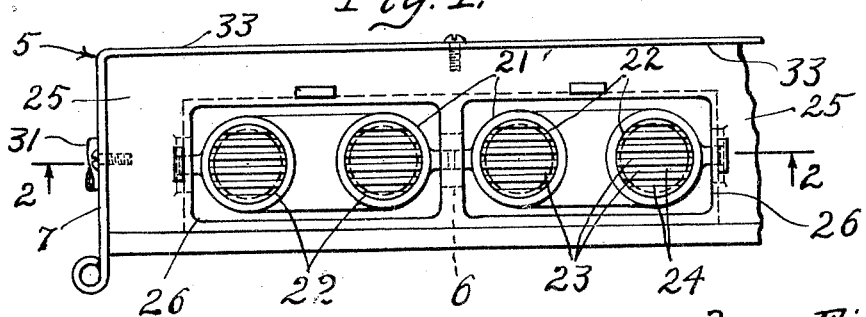
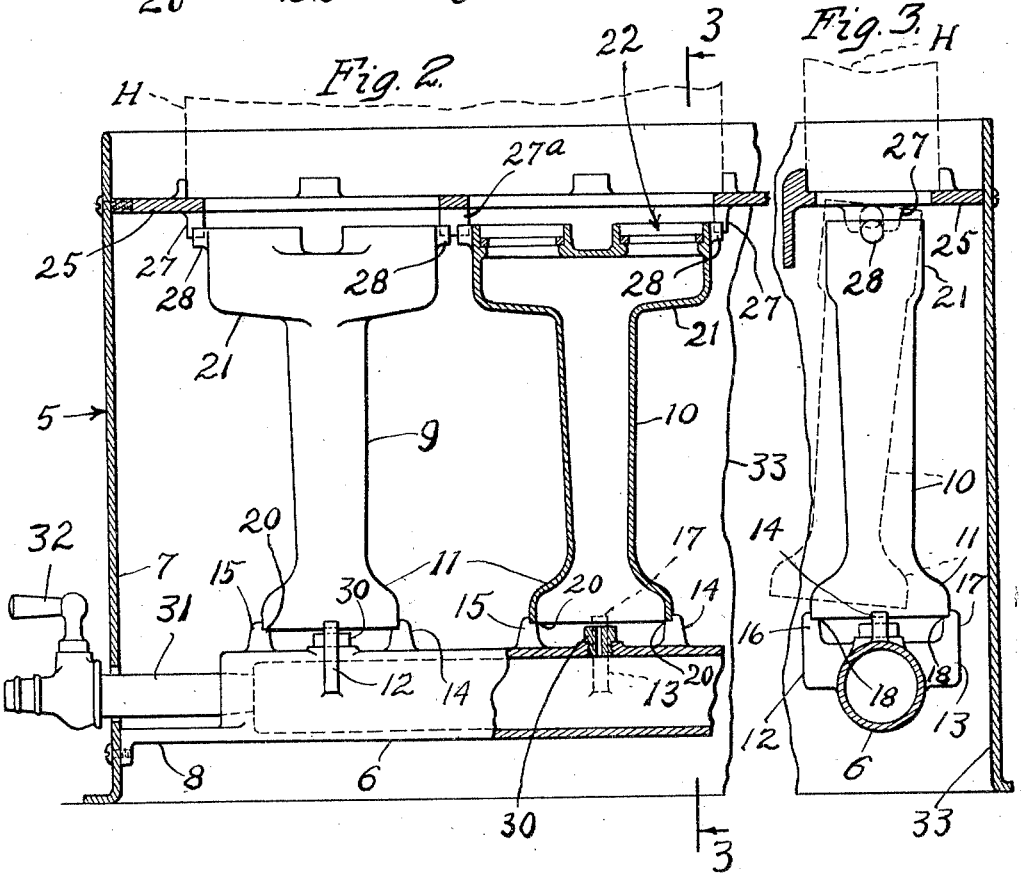
INVENTOR.
August J. Hartfield
BY Robt. W. Pearson
ATTORNEY.

Patented May 14, 1929.

1,712,885

UNITED STATES PATENT OFFICE.

AUGUST J. HARTFIELD, OF LOS ANGELES, CALIFORNIA.

GAS BURNER.

Application filed January 3, 1928. Serial No. 244,312.

This invention relates to a gas burner construction.

An important object of the invention is to simplify the construction of gas burners and to assemble the parts of such in a manner which will permit a more convenient removal of the mixing element for the purpose of cleaning, and as convenient a replacement of said element into its operative position.

A further object is to combine with the convenient removable feature an arrangement of parts which will safely retain the removable element in its operative position during use.

Other objects and advantages may hereinafter appear.

Referring to the accompanying drawings, which illustrate a preferred embodiment of the invention Figure 1 is a plan view of my newly invented gas burner provided with four burners.

Figure 2 is an enlarged vertical section of two of the burner elements shown in Figure 1, the line 2—2 on Figure 1 indicating the plane of section, except that one of the burner elements and part of the supply conduit is shown in side elevation.

Figure 3 is a view taken on line 3—3 of Figure 2. In this view a burner element is shown slightly raised and partly swung out from the operative position preparatory to its complete removal.

Referring in detail to the drawings, near the base of the frame 5 is the horizontal supply tube 6 which by preference and as shown is secured to the end walls 7 of said frame by short arms 8 cast integral with said supply tube 6. Upon the supply tube are supported the mixing tubes 9 and 10, two of which are shown in the drawings, but it is to be understood that the number of these mixing tubes may be varied as desired. The lower end of each mixing tube is provided with an expanded portion 11 desirably bell-shaped.

In order to support the mixing tubes there is provided for each tube a spider-like construction preferably formed integral with the supply tube 6. This spider-like construction is shown as consisting of the short oppositely disposed arms 12 and 13 which extend crosswise of the supply tube 6 and which cooperate with the lugs 14 and 15 located at right angles to said arms 12 and 13 and formed upon the upper side of tube 6. The end portions of said arms 12 and 13 are provided with the upstanding lugs 16 and 17 and each of these lugs has an internal shoulder 18 upon which the base 11 rests, the upper extremity of the lug 17 serving to center and hold in place the bell-shaped part 11 by reason of external contact therewith. The lugs 14 and 15 likewise have internal shoulders 20 to cooperate with the other pair of lugs in holding in place the lower end of the mixing tube.

Each of the mixing tubes is provided at its upper end with a hollow head 21 which is expanded in the direction of the length of the supply tube 6, and as shown in section, above the mixing tube 10 is provided at its top with a pair of burner outlets 22 having restricted orifices 23 which in the present embodiment are formed as parallel slots between the bars or imperforate burner elements 24.

Above the burner heads 21 is a horizontal plate 25 which has a rectangular opening 26 to form an open space above each pair of burner heads 21. At each end of this space 26 is a downwardly extending pair of lugs 27 or 27ª which are sufficiently spaced apart to receive between them an ear 28 provided at each end of the head 21. When the mixing tubes are seated upon their supporting shoulders 18 and 20 there remains above the ears 28, as well shown in Figure 3, a clearance 29 which permits each tube together with its burner head to be raised slightly and then swung to one side to the position shown in dotted lines in this figure for the purpose of its complete removal and cleaning. Each pair of lugs 27ª forms a centering device which is common to two adjacent mixing tubes.

The pair of downwardly extending lugs 27 at one end of the opening 26 is located at such distance from the corresponding pair of lugs at the other end of said opening that the burner head 21 fits lengthwise between these pairs of lugs. Therefore this construction forms a centering device which keeps the burner tubes from inclining in any direction and yet permits their convenient removal in the manner already described.

The supply tube 6 is provided with any desired gas-feeding element 30 and has the gas supplied by the gas feed pipe 31 controlled by the gas valve 32.

In the drawings the main frame 5 is shown provided with an end wall 7 and a back wall 33 but any suitable supporting frame may be provided.

The position of a radiator heating element H is indicated in dotted lines.

I claim:

1. In a burner construction, the combination with an elongated mixing tube the top of which is open and forms a burner element and a frame to support said tube in an upright position, of centering means external to said burner element for the top of said tube permitting a limited upward movement thereof, and a plurality of supports arranged in circular formation, the base of said tube resting upon said supports, and centering means external to said base forming a part of said supports, the aforementioned upward movement of said tube being sufficient to clear the base thereof from said centering means to permit the lower end of said tube to be swung out from said supports preparatory to the complete removal of said tube.

2. In a burner construction, a frame, a plurality of upright mixing tubes mounted side by side in said frame, each of said tubes having at its upper end diametrically opposite radially extending ears which extend toward the adjacent mixing tube, there being downwardly extending paired lugs on said frame between adjacent burners which afford a centering device common to the underlying ears of two adjacent mixing tubes, and centering means for the base portions of said mixing tubes extending slightly above their lower ends, the lugs which form the aforementioned upper centering device permitting a sufficient upward movement of each mixing tube to allow its lower end to swing clear of the lower centering means.

3. In a burner construction, a tubular mixing chamber having a burner outlet at its upper end and an open lower end, a spider-like support upon which the lower end of said tube rests, said support consisting of radial arms having projections which are located slightly beyond the external periphery of the lower end thereof, and centering means for the burner end of said tube permitting a sufficient upward movement thereof to raise its lower end above the aforementioned projecting means ranged therearound, to permit of its removal from the other portions of the burner construction.

4. In a burner construction, a tubular mixing chamber having a burner outlet at its upper end and an open lower end, a spider-like support upon which the lower end of said tube rests, said support having radial arms provided with projections which are located slightly beyond the external periphery of the lower end thereof, centering means for the burner end of said tube permitting a sufficient upward movement thereof to raise its lower end above the aforementioned projecting means ranged therearound, to permit of its removal from the other portions of the burner construction, a fuel feed supply outlet arranged within said spider construction to supply fuel to the open lower end of said mixing tube.

5. In a burner construction in combination, an elongated upright mixing tube provided at its upper end with burner outlets which extend across the upper end of said tube; and at its lower end with a support from which it may be disengaged by a slight upward movement, a centering construction located at the top of said mixing tube, said centering construction comprising two pairs of downwardly extending lugs, said pairs being located diametrically opposite to each other with respect to the top of said mixing tube and the lugs of each pair being in spaced relation to each other, there being ears provided on said burner head which extend between said lugs, a limited upward movement of said ears between said lugs being permitted to disengage said mixing tube from its support preparatory to its removal.

In testimony whereof I affix my signature.

AUGUST J. HARTFIELD.